Patented May 12, 1942

2,282,817

UNITED STATES PATENT OFFICE 2,282,817

TREATMENT OF REFINED WET PROCESSED CORN GERM OIL

Sidney Musher, New York, N. Y., assignor to Musher Foundation Incorporated, New York, N. Y., a corporation of New York No Drawing. Application January 8, 1941, Serial No. 373,609

11 Claims. (Cl. 260—398.5)

The present application relates to a method for treating refined deodorized corn oil pressed from wet processed corn germs in order to produce a more stable, more desirable and more highly valued corn oil product.

In accordance with the usual procedure of manufacturing corn oil from germs made by the "wet" process, whole corn is allowed to steep in water adjusted to about pH 3.2 with sulfurous acid for about 40 hours and at a slightly elevated temperature.

The corn germs are then removed from the corn kernel and dried and expressed to produce crude corn oil. This crude corn oil made from wet processed corn germ is then refined by causticating, bleaching, chilling and filtering to remove the sterol constituents, and finally deodorizing by injecting superheated steam into the oil at a temperature of about 400° F. or more.

The refined corn oil thus obtained has a tendency to "revert" rapidly and to develop objectionable "steepwater" flavors particularly when used for cooking and frying and when subjected to elevated temperatures. This reversion appears to be totally different from rancidity or oxidation and develops even where there is no apparent oxidative decomposition and where the oil is not exposed to excessive light or air. The flavor of the refined corn oil may become relatively unpleasant within as little as 24 hours after deodorizing but becomes worse as the oil is allowed to stand, even though the oil may have a low peroxide value, negative Kreis test and show a good stability as tested on the Swift Stability Apparatus.

In accordance with the present invention, it has been found that the addition of a relatively small amount, such as under 10% and preferably 1% to 4% or less, of crude unrefined corn oil made from "dry" processed corn germs to the refined corn oil made from "wet" processed corn germs produces a totally different corn oil having stable characteristics and fine flavor, and an oil which is particularly resistant to the "reversion" and steepwater flavors referred to above.

The crude corn oil from dry processed corn germs is prepared by cracking sound corn without any steeping or water washing process followed by aspirating and separating the corn germ. The corn germ is then expressed. When desired, the corn or corn germ may be heated or slightly toasted prior to or during the expression procedure. Approximately 0.75 to 1.25 pounds of crude corn oil is produced per bushel of corn dry processed in this manner.

As little as 0.25% to 0.5% of the dry processed crude corn oil for addition to the wet processed refined corn oil is sufficient to show a highly desirable effect although the most desirable proportion is in the range of 1% to 4%.

This effect is particularly surprising since it is observed that the crude corn oil obtained from both the dry and wet processed corn germ shows an antioxygenic effect whereas only the crude corn oil made from the dry processed corn germs has the desired effect on the refined corn oil from wet processed corn germs. In other words, it is not possible to obtain the fully desirable results of the present invention by adding crude corn oil from wet processed corn germs to the refined corn oil from wet processed germs.

Where desired, the crude corn oil from dry processed corn germs may very much less preferably be added to the wet processed corn oil before or during deodorizing by injecting superheated steam into the oil at a temperature of between 375° F. and 425° F., but the results are not nearly as pronounced nor as desirable as when added after deodorizing.

The crude corn oil from dry processed germs may, however, be added to the refined deodorized corn oil from wet processed germs while the latter oil is at an elevated temperature or before subjecting it to an elevated temperature of 175° F. to 250° F., preferably in the absence of steam and while the oil is in substantially dry condition.

The crude dry processed corn germ oil may also be added in a minor proportion to refined deodorized soya bean oil, such as in an amount under about 5% in order to prevent or retard the objectionable reversion which refined deodorized soya oil undergoes. After crude soya oil is expressed or extracted from soya beans, followed by causticating, refining and deodorizing, the refined deodorized soya oil is readily subject to reversion, which reversion feature may be controlled in accordance with the procedures of the present invention.

Having described my invention, what I claim is:

1. A process of protecting glyceride oils selected from the group consisting of refined soya oil and refined wet processed corn germ oil against reversion after deodorizing which comprises adding thereto a small proportion of crude dry processed corn germ oil.

2. A process of protecting refined corn oil expressed from wet processed corn germs against reversion after deodorizing which comprises treating said oil with a relatively small proportion, less than 10%, of crude corn oil made from dry processed corn germs.

3. A process of protecting glyceride oils selected from the group consisting of refined soya oil and refined wet processed corn germ oil against reversion after deodorizing which comprises adding to such glyceride oil at an elevated temperature a relatively small proportion, less than 10%, of crude dry processed corn germ oil.

4. A reversion protected glyceride oil selected from the group consisting of refined soya oil and refined wet processed corn germ oil, said aforementioned glyceride oil containing a relatively small proportion of crude corn oil expressed from dry processed corn germs.

5. A reversion protected refined corn oil prepared from wet processed corn germs containing a relatively small proportion, less than 10%, of crude dry processed corn germ oil.

6. A process of preparing a stabilized blended corn germ oil which comprises selecting one batch of corn germs, steeping them in water subjected to a pH of 3.2 with sulfurous acid for 40 hours at a slightly elevated temperature, removing the germs from the steep water, drying and expressing said germs to produce crude wet processed corn oil, causticizing said oil, and then deodorizing by injecting superheated steam into said oil at a temperature in excess of 400° F., selecting another batch of corn, cracking said corn without steeping, separating the corn germ, expressing the corn germ to produce a crude dry processed corn oil, and then adding a small amount of said dry processed corn oil to the wet processed corn oil.

7. The process of producing a stabilized blended corn germ oil which comprises selecting one batch of corn germs, steeping them in water for a prolonged period, removing the corn germs, drying and expressing them to produce a crude wet processed corn oil, and then selecting another batch of corn, cracking the same while dry, separating the corn germs and then expressing the same to obtain a crude, dry processed corn germ oil, and then mixing a small amount of the dry processed corn oil with the wet processed corn oil.

8. A process of producing a stabilized corn germ oil which comprises deodorizing a wet processed corn germ oil at a temperature of 375° F. to 425° F. by passing superheated steam therethrough, and then mixing said oil with a small amount of dry processed corn germ oil.

9. A process of producing a stabilized blended corn germ oil which comprises blending a refined deodorized wet processed corn germ oil with a small amount of a dry processed corn germ oil, and then subjecting the mixture to an elevated temperature of 175° F. to 250° F.

10. A process of producing a blended stabilized glyceride oil which comprises refining and deodorizing soya bean oil and then adding thereto less than 5% of a crude dry processed corn germ oil.

11. A reversion protected refined soya oil containing a relatively small proportion, less than 10%, of crude dry processed corn germ oil.

SIDNEY MUSHER.